(12) United States Patent
Hanai et al.

(10) Patent No.: US 7,490,580 B2
(45) Date of Patent: Feb. 17, 2009

(54) VAPORIZER THAT VAPORIZES A LIQUID TO GENERATE VAPOR

(75) Inventors: Satoshi Hanai, Haga-gun (JP); Kiyoshi Kasahara, Kamifukuoka (JP); Yuuji Asano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 739 days.

(21) Appl. No.: 10/519,725

(22) PCT Filed: Jul. 8, 2003

(86) PCT No.: PCT/JP03/08652

§ 371 (c)(1),
(2), (4) Date: Dec. 28, 2004

(87) PCT Pub. No.: WO2004/007355

PCT Pub. Date: Jan. 22, 2004

(65) Prior Publication Data

US 2005/0224070 A1    Oct. 13, 2005

(30) Foreign Application Priority Data

Jul. 11, 2002    (JP)    ............................. 2002-202638
Jul. 11, 2002    (JP)    ............................. 2002-202639

(51) Int. Cl.
*F22B 1/02*    (2006.01)
(52) U.S. Cl. ................ 122/31.1; 122/367.1; 126/350.2; 165/164
(58) Field of Classification Search ................ 122/31.1, 122/40, 367.1–367.3; 126/350.2; 165/104.19, 165/104.21, 164, 165, 166
See application file for complete search history.

(56) References Cited

U.S. PATENT DOCUMENTS

| | | | | | |
|---|---|---|---|---|---|
| 4,285,394 | A | * | 8/1981 | Stewart | .................. 165/104.21 |
| 4,460,388 | A | * | 7/1984 | Fukami et al. | ................. 55/521 |
| 4,473,111 | A | * | 9/1984 | Steeb | .......................... 165/153 |
| 4,883,117 | A | * | 11/1989 | Dobbs et al. | ................. 165/164 |

(Continued)

FOREIGN PATENT DOCUMENTS

DE    199 47 923    3/2001

(Continued)

*Primary Examiner*—Gregory A Wilson
(74) *Attorney, Agent, or Firm*—Fish & Richardson P.C.

(57) ABSTRACT

A vaporizer generates vapor by vaporizing a liquid. In particular, a vaporizer generates fuel vapor that is used for reforming fuel by vaporizing a liquid fuel that contains a hydrocarbon. This vaporizer includes a heating gas direct movement flow path along which a heating gas flows by moving directly in a horizontal direction; vaporization flow paths that are positioned such that they can exchange heat with the heating gas direct movement flow path, and that vaporizes liquid fuel; a fuel supply pipe that supplies the liquid fuel to the vaporization flow paths; and a vapor flow path that is positioned in an upstream portion on the heating gas direct movement flow path from the vaporization flow paths and that heat fuel vapor that is discharged from the vaporization flow paths. Fuel vapor that is generated on the vaporization flow paths circulates upwards in the direction of gravity along the vaporization flow paths, and subsequently is discharged from a top portion of the vaporization flow paths and is introduced into the vapor flow path. The fuel vapor then circulates in the direction of gravity along the vapor flow path.

16 Claims, 12 Drawing Sheets

U.S. PATENT DOCUMENTS

| | | | |
|---|---|---|---|
| 5,341,769 A * | 8/1994 | Ueno et al. | 122/367.3 |
| 5,709,264 A * | 1/1998 | Sweeney et al. | 165/115 |
| 6,640,579 B2 * | 11/2003 | Matsushima et al. | 62/435 |
| 6,742,575 B2 * | 6/2004 | Suzuki | 165/104.21 |
| 6,776,809 B2 * | 8/2004 | Shimazu | 48/76 |

FOREIGN PATENT DOCUMENTS

| | | |
|---|---|---|
| EP | 1 085 260 | 8/2000 |
| JP | H02-116604 | 5/1990 |
| JP | 3-252062 | 11/1991 |
| JP | 2000-319002 | 11/2000 |
| JP | 2001-064658 | 3/2001 |
| JP | 2001-132909 | 5/2001 |
| JP | 2001-135331 | 5/2001 |
| JP | 2001-153469 | 6/2001 |
| JP | 2001-263968 | 9/2001 |
| JP | 2001-332283 | 11/2001 |
| JP | 2002-042844 | 2/2002 |
| JP | 2002-107071 | 4/2002 |
| JP | 2002-327991 | 11/2002 |
| JP | 2002-350072 | 12/2002 |
| JP | 2003-194488 | 7/2003 |
| JP | 2004-044905 | 2/2004 |

* cited by examiner

VAPORIZER THAT VAPORIZES A LIQUID TO GENERATE VAPOR

TECHNICAL FIELD

The present invention relates to a vaporizer that generates vapor by vaporizing a liquid. In particular, the present invention relates to a vaporizer that generates vapor for reforming the quality of fuel by vaporizing a liquid fuel that contains hydrocarbons.

BACKGROUND ART

There is a method of supplying fuel gas to a fuel cell in which a liquid raw fuel that contains hydrocarbons such as methanol and gasoline is reformed into hydrogen rich fuel gas (referred to below as hydrogen rich gas) by a reforming system, and this hydrogen rich gas is supplied as fuel gas to a fuel cell (see, for example, Japanese Unexamined Patent Application, First Publication No. 2001-132909).

In this reforming system, a liquid fuel (i.e., a raw material) that is formed by a mixture of raw fuel and water is vaporized by a vaporizer to form raw fuel gas. This raw fuel gas is then supplied to a reformer together with air for reforming, and the raw fuel gas is made to undergo a reforming reaction so as to be reformed into hydrogen rich gas.

The conventional vaporizer that is used in this reforming system is disclosed in Japanese Unexamined Patent Application, First Publication No. 2001-135331.

This vaporizer is provided with a catalytic combustor in which an oxidation catalyst (for example, Pt or Pd) is supported on a metal honeycomb support, a group of tubes that are bent substantially in a U-shape and that circulate combustion gas generated by the catalytic combustor, a vaporization chamber that contains the group of tubes and is surrounded by a shell, a fuel supply apparatus that injects the liquid fuel into the vaporization chamber, and an extraction aperture that conducts the raw fuel gas generated by the vaporization of the liquid fuel out of the vaporization chamber. In this vaporizer, off gas that is discharged from the anode or cathode of the fuel cell is catalytically combusted by the catalytic combustor, and the combustion gas that is thereby obtained is introduced into the group of tubes. At the same time as this, the liquid fuel from the fuel supply apparatus is injected towards the surface of the group of tubes, and a thermal exchange takes place between the combustion gas and the liquid fuel, so that the liquid fuel is vaporized and raw fuel gas is obtained.

However, in this conventional vaporizer, in some cases a portion of the liquid fuel that is supplied to the vaporization chamber from the fuel supply apparatus is unable to be vaporized as it passes through the group of tubes, and is left on the bottom of the vaporization chamber in a liquid state. If liquid fuel is left in a liquid state on the bottom of the vaporization chamber in this manner, then it is not possible for the quantity of generated vapor (i.e., the quantity of generated raw fuel gas) during a transition to match the output from the fuel cell, so that the problem arises that the response is deteriorated.

Moreover, even if a heating source such as a catalytic combustor is placed on the bottom of the vaporization chamber so as to reduce the quantity of liquid left behind, it is still difficult to obtain a satisfactory response. This applies even more particularly in a fuel reforming system for a fuel cell that is mounted in a fuel cell vehicle, in which an extremely high transition response is required.

In Japanese Unexamined Patent Application, First Publication No. 2001-332283, a vaporizer is disclosed in which vaporization flow paths through which liquid fuel and fuel vapor circulate are placed alternatingly with heating gas flow paths through which heating gas circulates. Liquid fuel is supplied from above the vaporization flow path and drops down the vaporization flow path, and the liquid fuel is vaporized by a thermal exchange with the heating gas as it drops. As a result, fuel vapor is created, and the created fuel vapor is discharged from the bottom of the vaporization flow path.

However, in this vaporizer, because the fuel vapor flows downwards in the gravitational direction inside the vaporization flow path so as to be in a parallel flow relationship with the liquid fuel, it is not possible to effectively utilize the energy possessed by the fuel vapor.

Furthermore, in a conventional vaporizer, because combustion gas is introduced into a large number of tubes that have been bent substantially in a U-shape and is circulated through these tubes, there is a considerable pressure loss in the fuel gas. Accordingly, in order to increase the fuel gas flow rate so as to increase the heat quantity, it has been necessary to increase the number of tubes, thereby creating the problem that the size of the evaporator has increased. In other words, the size of the pressure loss on the fuel gas flow path is an obstacle to reducing the size of the vaporizer.

Moreover, when a combustion catalyst is supported inside the tubes, it is not possible to secure a sufficient catalytic layer volume.

Note that, in the above description, the term "response" is a characteristic that expresses a temporal delay when vapor is generated and supplied to match the required quantity that is determined based on a varying output from a fuel cell, and a "poor response" refers to the fact that this delay is sizeable. In addition, the term "a transition" refers to a state in which the quantity of generated vapor that is required relative to the output from the fuel cell abruptly changes, and "transition response" refers to the response during a transition.

DISCLOSURE OF THE INVENTION

Therefore, the present invention provides a vaporizer that is able to vaporize liquid fuel extremely efficiently by effectively utilizing energy, and has excellent response.

In addition, the present invention provides a vaporizer that reduces any loss of pressure on the gas flow path while enabling the size of the apparatus to be reduced.

In order to solve the above described problems, the present invention is a vaporizer that vaporizes a liquid to generate vapor having: a plurality of heating gas flow paths through which heating gas circulates; a plurality of vaporization flow paths that are provided with bottoms and are located such that they can exchange heat with the heating gas flow paths, and that vaporize the liquid that is supplied from above in the direction of gravity, and that discharge the vaporized vapor upwards in the direction of gravity; and a plurality of fins that are provided on an inner surface of the vaporization flow paths.

Here, in particular, the liquid is a liquid fuel that contains a hydrocarbon, and the vapor is a fuel vapor used for reforming fuel.

By employing this type of structure, it is possible to increase the surface area of the heating surface using the fins, and, as a result of liquid fuel adhering to the surface of the fins, it is easy for the liquid fuel to become spread out. In addition, the fins increase the frequency at which contact is made with the liquid fuel, and make the temperature difference between the adhered liquid fuel and the fins a temperature difference that makes it easy for the liquid fuel to be vaporized. Moreover, because the liquid fuel and the fuel vapor come into contact due to their counter flow inside the vaporization flow paths, droplets of liquid fuel that are falling are refined, and the liquid fuel can be preheated by the fuel vapor. As a result, the vaporizer is able to vaporize liquid fuel extremely efficiently and rapidly, and the response of the vaporizer is improved considerably.

In the above described vaporizer, it is also possible for the plurality of heating gas flow paths and the plurality of vaporization flow paths to be placed so as to alternate with each other.

By employing this type of structure, it is possible to improve the vapor creation performance while keeping the size of the apparatus small.

In the above described vaporizer, it is also possible for at least a portion of each of the plurality of heating gas flow paths to be provided in a substantially orthogonal direction relative to the plurality of vaporization flow paths.

By employing this type of structure, the heating gas flow paths can be placed in a horizontal direction so that the placement of the entry and exit apertures of the heating gas flow path is simplified, and the structure of the vaporizer can be simplified. In addition, any loss of pressure on the heating gas flow path can be kept at a lower level.

In the above described vaporizer, it is also possible for the plurality of fins to be provided in a plurality of steps running in the direction of gravity, and for fins in one step to be placed so as to be offset from fins in adjacent steps.

By employing this type of structure, the liquid fuel is dispersed when it collides with the fins, and the dispersed liquid fuel is further dispersed when it collides with fins lower down. By repeating this process, the dispersal of the liquid fuel can be accelerated. In addition, because the rate at which the fuel vapor that is created within the vaporization flow paths rises along these vaporization flow paths can be slowed by the presence of the fins that are provided in a plurality of steps, the droplets of liquid fuel that fall through the vaporization flow paths can be prevented from being blown back up by the fuel vapor, and the droplets can be prevented from being discharged from the top portion of the vaporization flow paths without having been vaporized. Accordingly, the frequency at which the liquid fuel comes into contact with the fins can be increased, so that the vaporization of the liquid fuel is accelerated.

In the above described vaporizer, it is also possible for there to be further provided a porous material that is placed on a top side of the bottom portions of the plurality of vaporization flow paths, and a heating apparatus that is placed on a bottom side of the bottom portions.

By employing this type of structure, it is possible to vaporize liquid fuel that could not be vaporized as it fell through the vaporization flow paths on the porous material, and it is possible to prevent pools of liquid being formed on bottom portions of the vaporization flow paths.

In the above described vaporizer, it is also possible for there to be further provided liquid supply pipes that are placed above the plurality of vaporization flow paths, and for a plurality of supply holes through which the liquid drips to be provided in the liquid supply pipes.

By employing this type of structure, because the liquid fuel is dripped from the plurality of supply holes in the fuel supply pipes that are placed above the vaporization flow paths, liquid fuel can be supplied after being widely dispersed inside the vaporization flow paths.

In order to solve the above described problems, the present invention is also a vaporizer that vaporizes a liquid to generate vapor having: a heating gas direct movement flow path along which heating gas flows by moving directly in a horizontal direction; a vaporization section that is positioned such that it can exchange heat with the heating gas direct movement flow path, and that vaporizes the liquid and causes the vapor therefrom to flow upwards in the direction of gravity; a liquid supply section that supplies the liquid to the vaporization section; and a superheating section that is positioned in an upstream portion on the heating gas direct movement flow path from the vaporization section such that it can exchange heat with the heating gas direct movement flow path, and that places the vapor that is discharged from the top portion of the vaporization section in a superheated state, wherein the superheating section is provided with a vapor flow path that is connected with the top portion of the vaporization section and that causes the vapor to circulate.

Here, the liquid is a liquid fuel containing a hydrocarbon, and the vapor is a fuel vapor used for fuel reformation.

By employing this type of structure, fuel vapor that is generated in the vaporization section circulates upwards in the direction of gravity along the vaporization section, and, subsequently, is discharged from a top portion of the vaporization section and is introduced into the superheating section. The fuel vapor then, preferably, circulates in the direction of gravity along the superheating section. Accordingly, because any loss of pressure in the heating gas on the heating gas direct movement flow path can be reduced, so that a greater quantity of heating gas can be supplied, the quantity of heat that is supplied can be increased. Moreover, because fuel vapor that is generated in the vaporization section is made to exchange heat with heating gas in the superheating section, the fuel vapor can be raised to an even higher temperature. In addition, because fuel vapor that has been discharged from a top portion of the vaporization section is introduced into the superheating section and circulated in the direction of gravity, the size of the vaporization section can be made more compact. Accordingly, it is possible to obtain an improvement in the performance and a reduction in the size of the vaporizer.

In the above described vaporizer, it is also possible for the vapor flow path of the superheating section to be formed so as to intersect with the flow of the heating gas a plurality of times.

By employing this type of structure, because the fuel vapor circulates so as to intersect with the flow of the heating gas a plurality of times in the superheating section, the fuel vapor can be sufficiently heated and high temperature fuel vapor can be created.

In the above described vaporizer, it is also possible for there to be provided a temperature control section that is placed around the vaporization section and is connected to a discharge aperture of the heating gas direct movement flow path, and for the temperature control section to be provided with a bottom portion flow path into which the heating gas discharged from the heating gas direct movement flow path is introduced.

By employing this type of structure, heating gas that is discharged from the heating gas direct movement flow path is introduced into a bottom portion flow path that is provided at the bottom portion of this temperature control section. Because the bottom portion of the vaporization section is heated by heating gas flowing along the bottom portion flow path of the temperature control section, liquid fuel that has pooled on the bottom of the vaporization section can be vaporized using discharge heat from the heating gas. Accordingly, the performance of the vaporizer can be improved.

In the above described vaporizer, it is also possible for the temperature control section to be provided with a side flow path that causes the heating gas introduced into the bottom portion flow path to circle around a side of the vaporization section and then rise upwards.

By employing this type of structure, heating gas introduced into the bottom portion of the temperature control section circles from this bottom portion around the side and then rises upwards through the temperature control section. Accordingly, because the temperature of the vaporization section can be maintained using exhaust heat from the heating gas, and heat discharge from the vaporization section can be suppressed, the performance of the vaporizer is improved.

In the above described vaporizer, it is also possible for there to be provided a thermal insulation chamber that is placed around the superheating section.

By employing this type of structure, because the temperature of the superheating section can be maintained by the thermal insulating chamber, so that heat discharge from the vaporization section can be suppressed, the performance of the vaporizer is improved.

In the above described vaporizer, it is also possible for a catalyst to be provided in an interior of the heating gas direct movement flow path.

By employing this type of structure, a predetermined gas can be catalytically combusted inside the heating gas direct movement flow path so as to create heating gas, and heat discharge from the heating gas direct movement flow path can be suppressed, so that the performance of the vaporizer is improved.

In the above described vaporizer, it is also possible for a first catalyst to be provided in the interior of the heating gas direct movement flow path at a position where it can exchange heat with the superheating section, and for a second catalyst to be provided in the interior of the heating gas direct movement flow path at a position where it can exchange heat with the vaporizing section.

The temperature conditions in the vaporization section and the superheating section are different, however, by employing different catalysts each having an active temperature that is appropriate for the respective temperature conditions, it is possible to extend the durability of the catalyst.

In the above described vaporizer, when the heating gas is obtained by burning off gas that is discharged from a fuel cell, it is preferable that the first catalyst that is placed adjacent to the superheating section is an oxidation catalyst, and that the second catalyst that is placed adjacent to the vaporization section is an emission purifying catalyst.

By employing this type of structure, it is possible to create heating gas by the catalytic combustion of off gas inside the heating gas direct movement flow path that passes through the superheating section. As a result, compared with when a catalytic combustor is installed outside the vaporizer, it is possible to suppress the discharge of heat from the heating gas direct movement flow path and thereby improve the heating efficiency, and it is possible to make the overall reforming system more compact. In addition, because the vaporizer is provided with an emission purifying catalyst downstream from the location where the off gas is catalytically combusted, it is possible to provide the vaporizer with an emission purifying function. Accordingly, it is possible to achieve a simpler fuel reforming system.

BRIEF DESCRIPTION THE DRAWINGS

BEST MODE FOR CARRYING OUT THE INVENTION

The first second and third embodiments of the vaporizer of the present invention will now be described with reference made to the drawings from FIG. 1 through FIG. 9E. Note that the vaporizer in each of the embodiments described below is of a type that is used in a fuel reforming system for a fuel cell, in which fuel vapor that is generated by the vaporizer is supplied to a reformer and is reformed into hydrogen rich fuel gas for a fuel cell by the reformer.

First Embodiment

Firstly, the first embodiment of the present invention will be described with reference made to FIG. 1 through FIG. 5.

Figure 1:
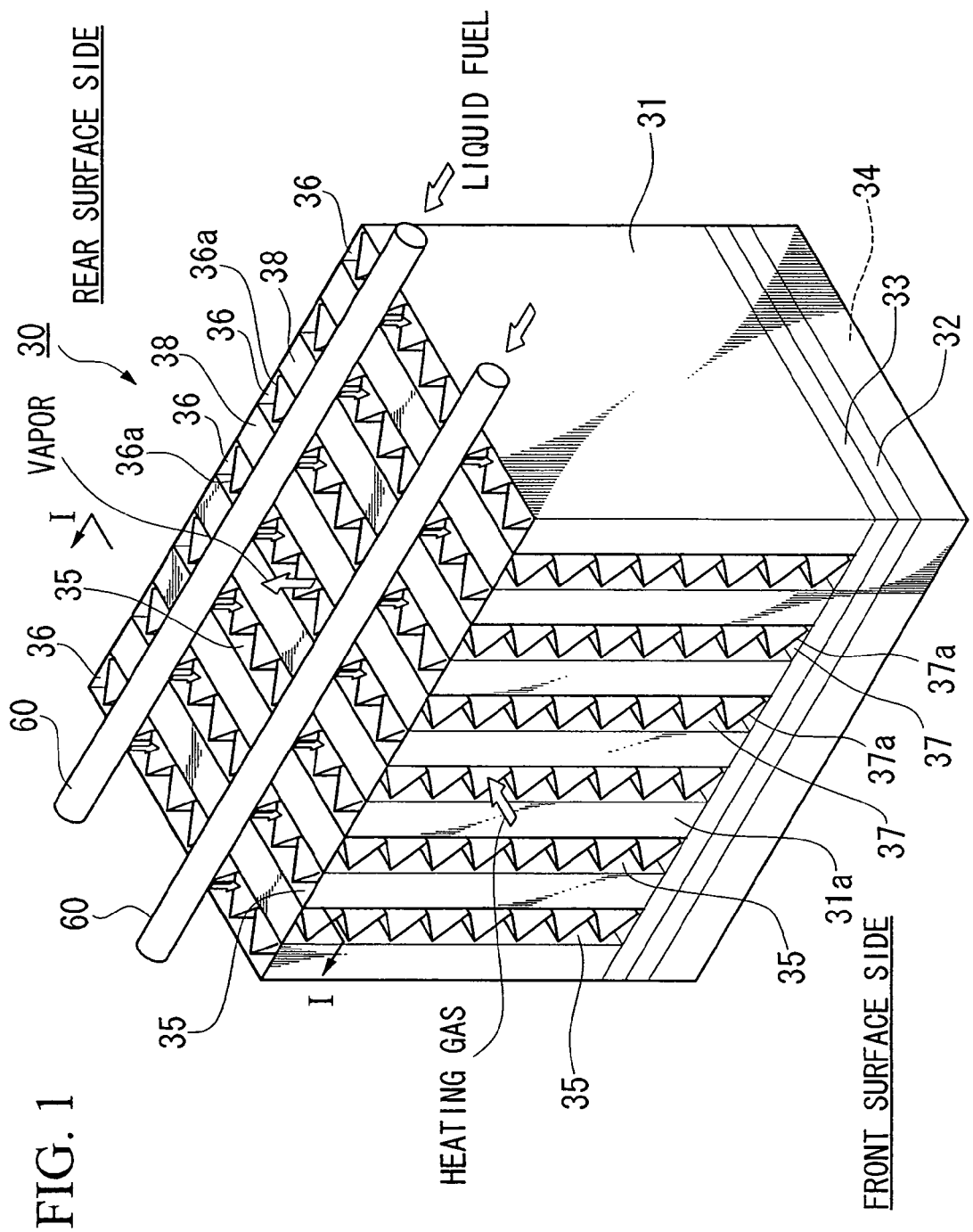
FIG. 1 is an external perspective view of a vaporizer according to the first embodiment of the present invention.

FIG. 1 is a schematic structural view of a vaporizer 30. The vaporizer 30 is provided with a case 31 having the shape of a rectangular parallelepiped. A porous material 33 is mounted on the top side of a bottom plate (i.e., a bottom portion) 32 of the case 31, and a heating chamber (i.e., the heating apparatus) 34 is provided on the bottom side of the bottom plate 32.

The interior of the case 31 above the porous material 33 is divided into a large number of narrow width chambers that are formed in parallel with each other by partitioning walls 35, and these chambers are formed alternatingly as vaporization flow paths 36 and heating gas flow paths 37, with the outermost chamber in all cases being a vaporization flow path.

Figure 2:
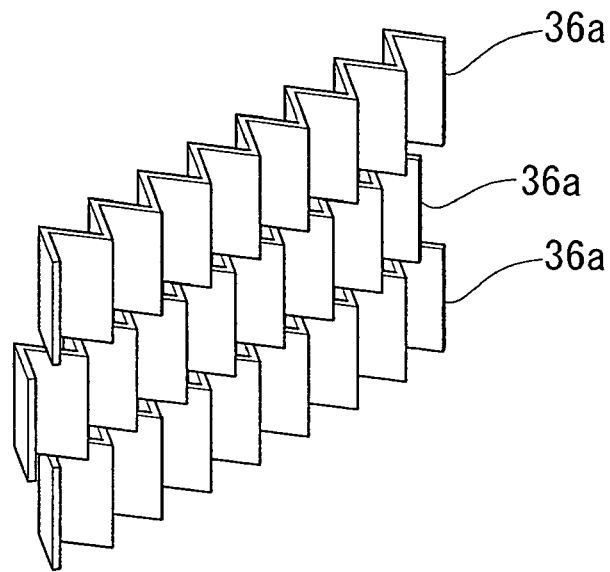
FIG. 2 is an external perspective view of fins that are provided on a vaporization flow path of the vaporizer of the first embodiment.
Figure 3:
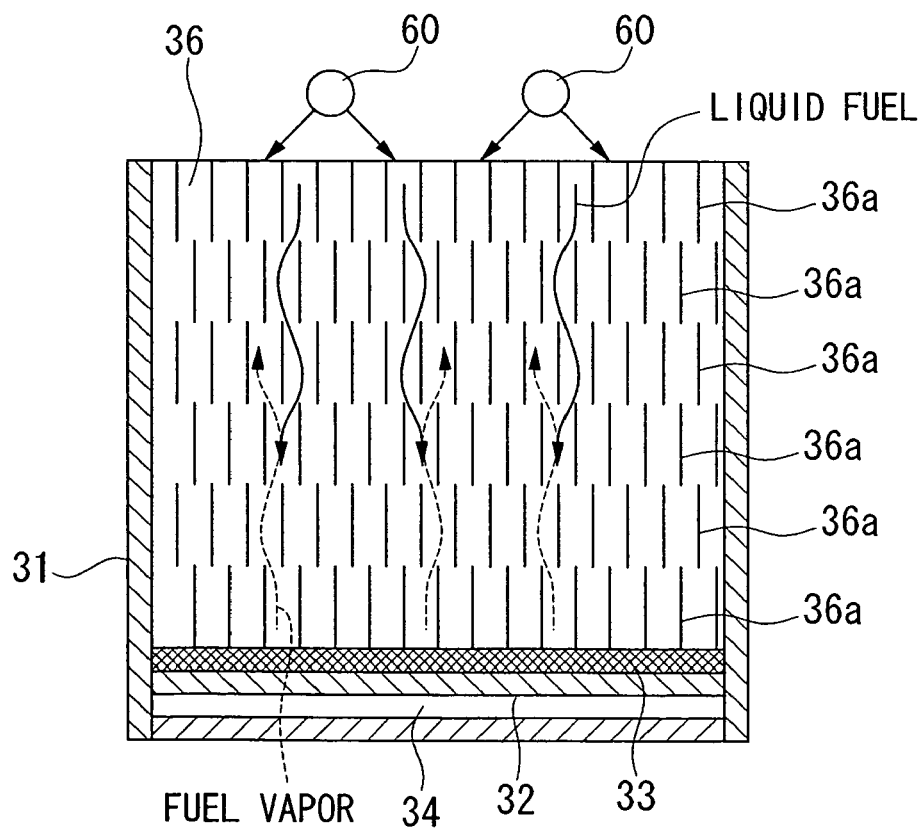
FIG. 3 is a cross-sectional view taken along the line I-I in FIG. 1.

Each of the vaporization flow paths 36 is open only at the top, and bottom portions thereof are blocked by the bottom plate 32 that is provided with the porous material 33, while all four sides are blocked by peripheral walls 31a of the case 31 and by partition walls 35. Namely, each vaporization flow path 36 is formed as a box shape that is open only at the top. Fins 36a having a substantially triangular waveform-shaped cross-section are placed inside each vaporization flow path 36 such that apex portions thereof extend in a vertical direction (i.e., in the direction of gravity). In addition, as is shown in FIG. 2 and FIG. 3, the fins 36a are installed in steps running in the up-down direction inside each vaporization flow path 36, and fins 36a that are adjacent vertically are positioned such that the apex portions of one fin 36a are offset from the apex portions of the adjacent fins 36a. The apex portions of these fins 36a are joined to the partition walls 35 that form a boundary with the heating gas flow paths 37.

In contrast, each of the heating gas flow paths 37 is blocked at the top by a top plate 38, and bottom portions thereof are blocked by the bottom plate 32 that is provided with the porous material 33. The two side portions are blocked by the partition walls 35, while the front surface side and rear surface side of the case 31 are completely open. Namely, each heating gas flow path 37 is formed as a rectangular cylinder whose opening extends from the front surface side to the rear surface side. In each heating gas flow path 37, heating gas that flows in from the aperture on the front surface side is able to flow out from the aperture on the rear surface side. Moreover, fins 37a having a substantially triangular waveform-shaped cross-section are placed inside each heating gas flow path 37 such that apex portions thereof extend in a horizontal direction. In addition, apex portions of these fins 37a are joined to the partition walls 35 that form a boundary with the vaporization flow paths 36.

Figure 4:
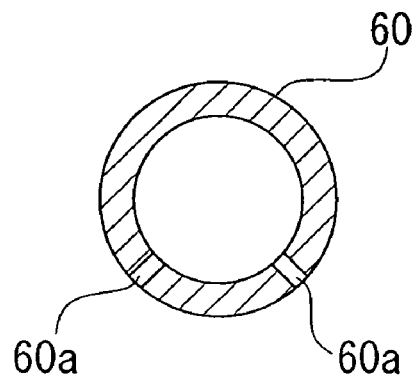
FIG. 4 is a cross-sectional view of a fuel supply pipe of the vaporizer of the first embodiment.

Two fuel supply pipes 60 and 60, whose axes extend in a direction in which the vaporization flow paths 36 and heating gas flow paths 37 are placed adjacent to each other, are provided parallel with each other above the case 31. Distal ends of each fuel supply pipe 60 are blocked, and, as is shown in FIG. 4, pairs of supply holes 60a are open in each fuel supply pipe 60 facing diagonally downwards to the left and right in portions that are located above the respective vaporization flow paths 36.

The porous material 33 that is provided on the top side of the bottom plate 32 may be formed, for example, by a nickel-based metal porous material (having, for example, a hole diameter of 0.5 mm and a specific surface area of 7500 $m^2/m^3$) having a large specific surface area, and is brazed onto the bottom plate 32.

A heating medium is able to circulate through the heating chamber 34 that is provided beneath the bottom plate 32, and heat from the heating medium is transmitted to the bottom plate 32 and the porous material 33. Note that, in the first embodiment, heating gas that is discharged from the heating gas flow path 37 is introduced into the heating chamber 34 as a heating medium.

An operation of the vaporizer 30 that is constructed in this manner will now be described.

Heating gas is introduced into each heating gas flow path 37 from the apertures on the front surface side of the case 31. The heating gas then advances in a horizontal direction inside the heating gas flow paths 37, and is discharged from the apertures on the rear surface side of the case 31. When the heating gas circulates inside the heating gas flow paths 37, a portion of the heat of the heating gas is transmitted to the fins 37a and the partition walls 35, and is further transmitted to the fins 36a of the vaporization flow paths 36.

The heating gas discharged from the heating gas flow paths 37 is then supplied to the heating chamber 34. After circulating through the heating chamber 34, it is discharged to the outside. When the heating gas is circulating through the heating chamber 34, a portion of the heat from the heating gas is transmitted to the porous material 33 via the bottom plate 32.

Meanwhile, liquid fuel (i.e., a mixed liquid of methanol or gasoline and water or the like) is supplied to each fuel supply pipe 60, and is injected towards the respective vaporization fuel paths 36 from the supply holes 60a that are provided in the fuel supply pipes 60. The liquid fuel that has been ejected from the supply holes 60a forms droplets that adhere to the fins 36a. These droplets then run down over the surface of the fins 36a, or else pass through the gaps formed between the fins 36a and drop down. The majority of the liquid fuel that drops through the gaps between the fins 36a also collides against the lower fins 36a as it drops, and adheres to the surface of the fins 36a. In either case, as is shown by the solid line in FIG. 3, the liquid fuel flows downwards in the gravitational direction inside the vaporization flow paths 36. The liquid fuel that has adhered to the fins 36a exchanges heat with the heating gas that is circulating through the heating gas flow paths 37 via the partition walls 35 and the fins 36a, and is vaporized to form fuel vapor. The liquid fuel that could not be vaporized as it fell through the interior of the vaporization flow paths 36 permeates through the minute holes in the porous material 33 before it reaches the bottom plate 32, and here exchanges heat with the heating gas via the porous material 33 so as to be instantly vaporized and form fuel vapor.

As is shown by the broken line in FIG. 3, the fuel vapor that has been created in this manner rises upwards in the direction of gravity inside the vaporization flow paths 36 and is discharged from the top portion apertures of the vaporization flow paths 36.

Accordingly, in this vaporizer 30, while liquid fuel or fuel vapor circulates inside the vaporization flow paths 36 either upwards or downwards in the direction of gravity, as described above, the heating gas flows in a horizontal direction inside the heating gas flow paths 37, therefore, the flow directions intersect each other.

Figure 5:
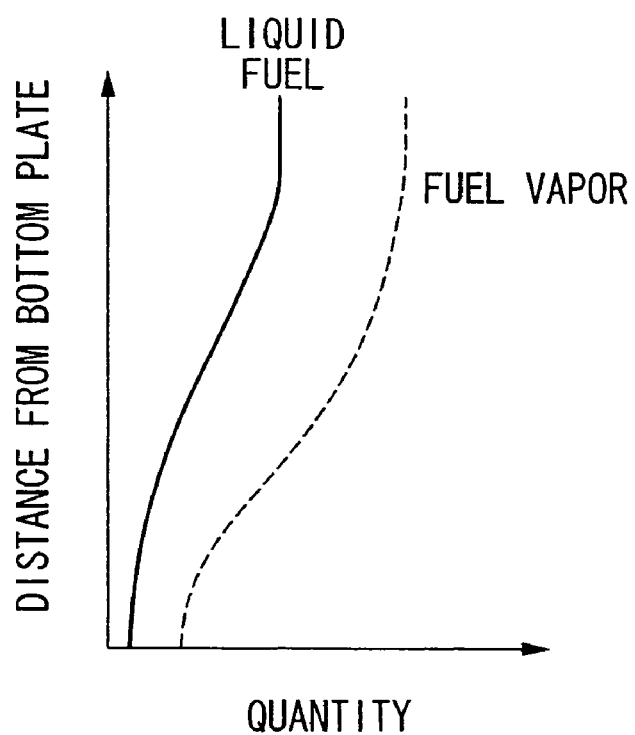
FIG. 5 is a view showing changes in the volumes of liquid fuel and fuel vapor of the vaporizer of the first embodiment.

Note that FIG. 5 is a view showing the relationship between the distance from the bottom plate 32 and the quantities of liquid fuel and created fuel vapor. As can be seen from the drawing, the quantity of liquid fuel decreases the closer to the bottom plate 32, while the quantity of fuel vapor increases the further away from the bottom plate 32.

However, in this vaporizer 30, because the vaporization flow paths 36 and the heating gas flow paths 37 are placed alternatingly, it is possible to improve the vapor creation performance while keeping the size of the apparatus small.

Moreover, because the fins 36a are provided in the vaporization flow paths 36, the surface area of the heating surface is extremely large so that it is easy for the liquid fuel to spread out over a large area, resulting in the vaporization of liquid fuel being accelerated.

In addition, when the liquid fuel collides against the fins 36a, in addition to adhering to the positions where it collides (referred to below as collision positions), the liquid fuel is also scattered and the scattered liquid fuel collides once again with fins 36a close to the collision positions. Because such collisions are repeated, the frequency at which the liquid fuel comes into contact with the surfaces of the fins 36a, which are heated surfaces, increases, so that the vaporization of the liquid fuel is accelerated.

In particular, because the fins 36a are provided in steps in a vertical direction and because the apex portions of the fins 36a are offset vertically, the liquid fuel collides against the fins 36a and is dispersed, and this dispersed liquid fuel collides once again with the lower fins 36a and is again dispersed. By repeating such collisions, the dispersion of the liquid fuel can be accelerated. Moreover, a reduction in the rate at which the fuel vapor created inside the vaporization flow paths 36 rises through the vaporization flow paths 36 is obtained due to the presence of the multi-stepped fins 36a. Therefore, it is possible to prevent liquid droplets of liquid fuel that are falling through the vaporization flow paths 36 from being blown up by the fuel vapor, and it is possible to prevent the liquid droplets from being discharged from the top portion aperture of the vaporization flow paths 36 without having been vaporized. Accordingly, the frequency of the collisions (i.e., the frequency of contact) of liquid fuel against the fins 36a is further increased, and the vaporization of the liquid fuel is further accelerated.

Furthermore, because a temperature gradient is generated in the fins 36a in a direction approaching or moving away from the partition walls 35, a temperature difference between the surfaces of the fins 36a and the liquid fuel that is adhered to these surfaces is created in the portion forming a nucleate boiling zone, so that heat is easily transmitted in this portion, and liquid fuel that has adhered to the surface of the fins 36a is easily vaporized.

Moreover, because the temperature distribution over the whole of the fins 36a inside the vaporization flow paths 36 is made substantially uniform by the thermal conduction of the fins 36a, the entire range of the vaporization flow paths 36 can be used as a heat exchange portion, so that liquid fuel can be efficiently vaporized and changed into fuel vapor.

Furthermore, by vertically offsetting the apex portions of the fins 36a, all of the gaps between the fins 36a in a single vaporization flow path 36 are connected. Therefore, liquid droplets of liquid fuel that fall through the vaporization flow paths 36 and also created fuel vapor are scattered and distributed, so that the entire thermal load inside a single vaporization flow path 36 is made uniform. Accordingly, the liquid fuel can be efficiently vaporized.

Moreover, because the droplets of liquid fuel fall from top to bottom inside the vaporization flow paths 36, and the created fuel vapor rises inside the vaporization flow paths 36, the droplets of liquid fuel and the fuel vapor come into contact due to their counter flow so that preheating and refinement of the droplets is accelerated. In addition, the liquid film of liquid fuel that is formed on the surface of the fins 36a is thinned out more rapidly resulting in the vaporization of liquid fuel being accelerated.

Accordingly, the vaporizer 30 is able to vaporize liquid fuel extremely efficiently and rapidly, and has excellent response.

When this vaporizer 30 is mounted in a fuel cell vehicle, then there is a possibility that the attitude of the vaporizer 30 will change in a variety of ways. However, even if the attitude of the vaporizer 30 is changed, in this vaporizer 30, because the fins 36a act as partition walls, it is possible to restrict the liquid fuel from forming a pool in one area in the vaporization flow paths 36. Accordingly, even if there is a change in attitude, the heating load inside the vaporization flow path 36 can be kept uniform, and a constant vaporization performance can be maintained.

Note that the fuel vapor that is discharged from the top portion apertures of the vaporization flow paths 36 is supplied to a reformer (not shown) after passing through a collection passage (not shown), and is reformed into hydrogen rich fuel gas in the reformer and is then supplied to the fuel cell.

Second Embodiment

Figure 6:
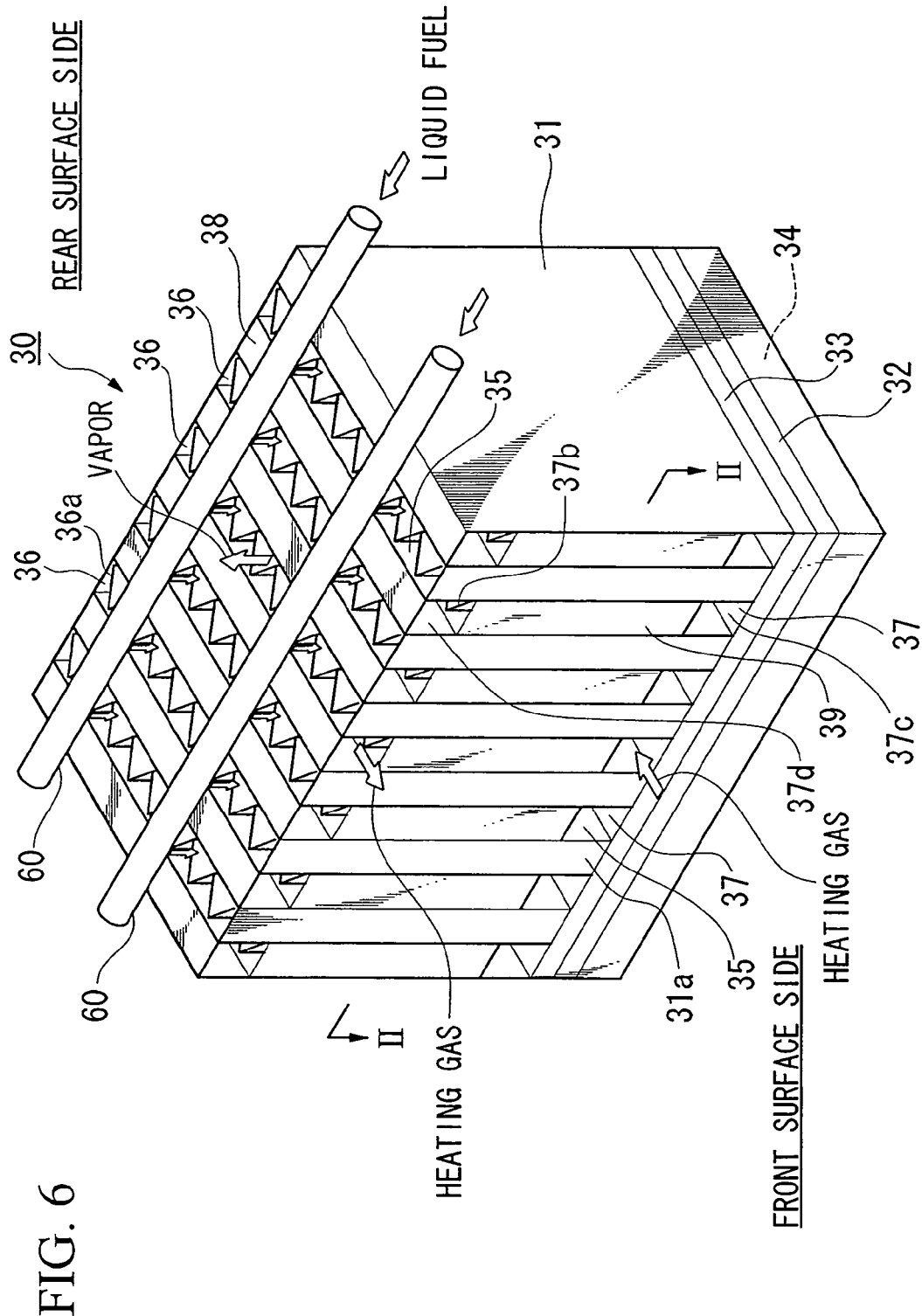
FIG. 6 is an external perspective view of a vaporizer according to the second embodiment of the present invention.
Figure 7:
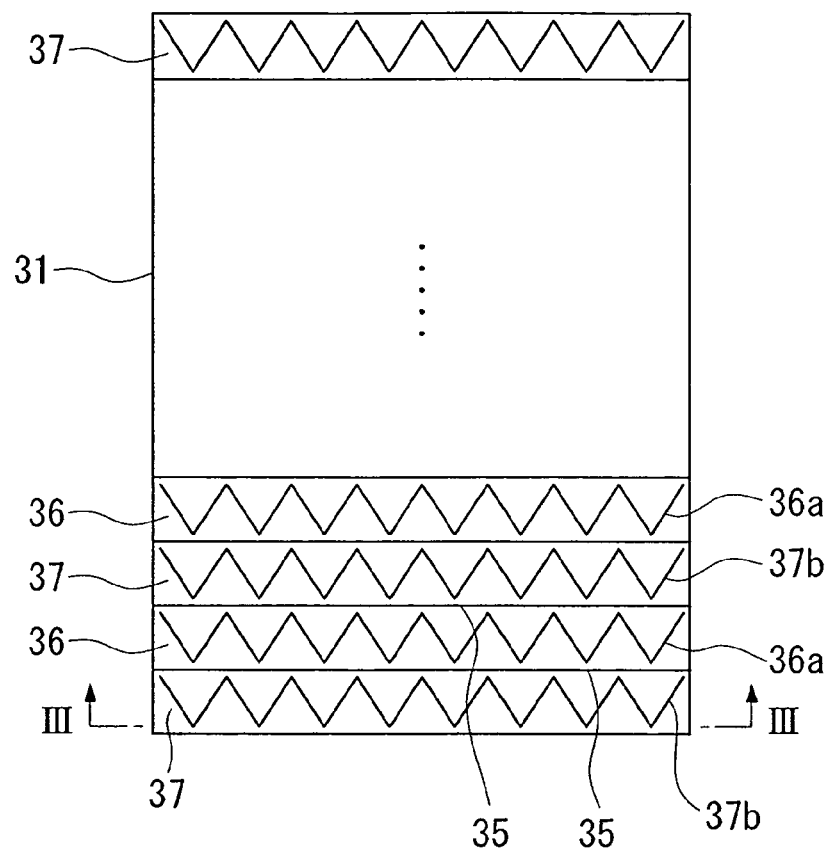
FIG. 7 is a cross-sectional view taken along the line II-II in FIG. 6.

The second embodiment of the vaporizer 30 of the present invention will now be described with reference made to FIGS. 6 through 8. The vaporizer 30 of the second embodiment differs from that of the first embodiment in the following points.

In the vaporizer 30 of the first embodiment, the respective heating gas flow paths 37 are completely open on the front surface side and the rear surface side of the case 31, however, in the vaporizer 30 of the second embodiment, on the front surface side of the case 31, only the top portion and bottom portion of the respective heating gas flow paths are open, and on the rear surface side of the case 31, the entire surface of the respective heating gas flow paths 37 are blocked. Moreover, an aperture 37c that is provided on the bottom side of the front surface side of the case 31 forms a heating gas intake aperture, while an aperture 37d that is provided on the top side thereof forms a heating gas discharge aperture. Between the apertures 37c and 37d is blocked off by a side plate 39. Furthermore, fins 37b having a substantially triangular waveform-shaped cross-section are provided inside each heating gas flow path 37 in the area of the tops of the side plates 39, with the apex portions thereof extending in a vertical direction (i.e., in the direction of gravity). The apex portions of these fins 39b are joined to the partition walls 35 that form a partition with the vaporization flow paths 36. Note that FIG. 7 is a cross-sectional view taken along the line II-II in FIG. 6.

Figure 8:
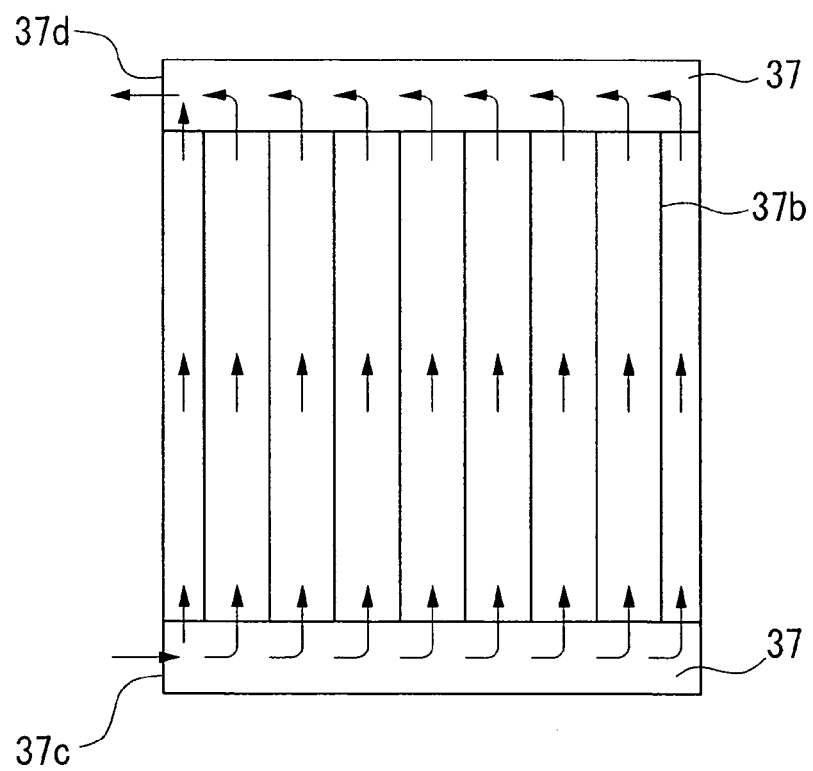
FIG. 8 is a cross-sectional view taken along the line III-III in FIG. 7.

In this vaporizer 30, as is shown in FIG. 8, heating gas flows into each heating gas flow path 37 from the respective lower side apertures 37c, and advances through the interior of the heating gas flow paths 37 towards the rear surface side of the case 31. In addition, the heating gas flows into the respective gaps formed between the fins 37b and rises up. When the heating gas reaches the top portions of the interior of the heating gas flow paths 37, it changes direction towards the apertures 37d on the upper side, and is discharged from the apertures 37d.

Accordingly, in this vaporizer 30, the liquid fuel, the fuel vapor, and the heating gas all flow in the direction of gravity.

The remainder of the structure is the same as that of the first embodiment, therefore, the same symbols are given to the same component elements and a description thereof is omitted.

The vaporizer 30 of this second embodiment is also able to vaporize liquid fuel extremely efficiently and rapidly, and has excellent response.

Third Embodiment

Note that the present invention is not limited to the above described embodiments.

Figure 9B:
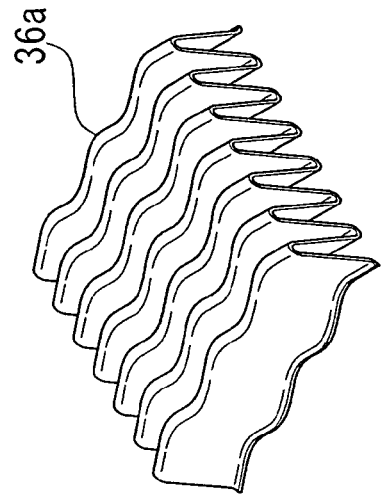
FIGS. 9A to 9E are perspective views showing a variety of modes of fins that are provided on a vaporization flow path of a vaporizer of the third embodiment.
Figure 9A:
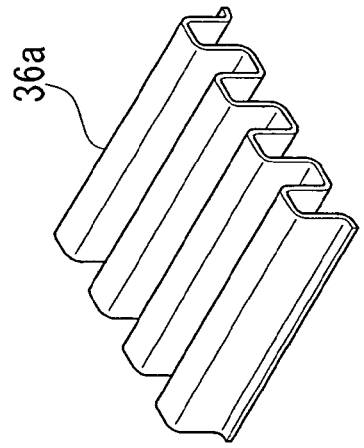
Figure 9E:
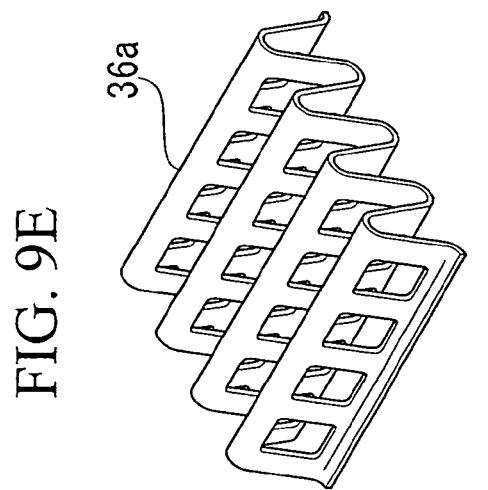
Figure 9D:
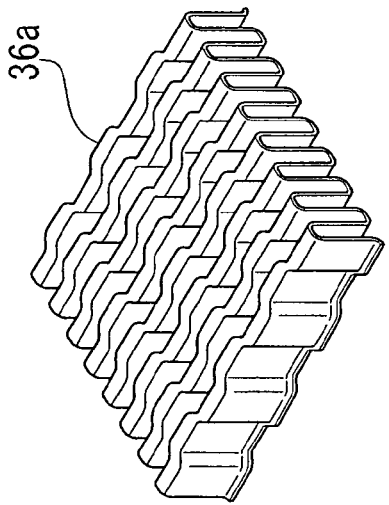
Figure 9C:
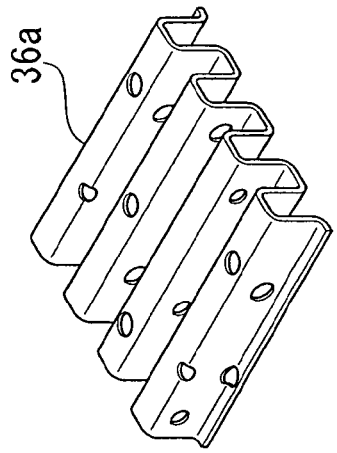

For example, the shape of the fins 36a provided inside the vaporization flow paths 36 is not limited to a substantially triangular waveform shape, and a variety of shapes, such as those shown in FIGS. 9A to 9E, can be employed. FIG. 9A is a fin having a rectangular waveform-shaped cross-section, FIG. 9B is what is known as a heliborne fin, FIG. 9C is a multi-hole plate fin, FIG. 9D is what is known as a cellate fin, and FIG. 9E is what is known as a louver fin.

In addition, in the above described embodiments, the fins 36a are provided in a plurality of steps in the direction of gravity inside the vaporization flow paths 36, and fins 36a in adjacent steps are placed offset to each other, however, the present invention is still achieved even if multiple layers of fins 36a are not provided or if the fins 36a are not offset.

It is also possible for the heating apparatus that is provided on the bottom side of the bottom portion of the vaporization flow paths to be formed by an electric heater or the like.

Fourth Embodiment

The fourth embodiment of the vaporizer of the present invention will now be described with reference made to FIG. 10 through FIG. 16. Note that the vaporizer of the fourth embodiment is of a form that is used in a fuel reforming system for a fuel cell, and fuel vapor that is generated by this vaporizer is supplied to a reformer, and is reformed by the reformer into hydrogen rich fuel gas for a fuel cell.

Figure 10:
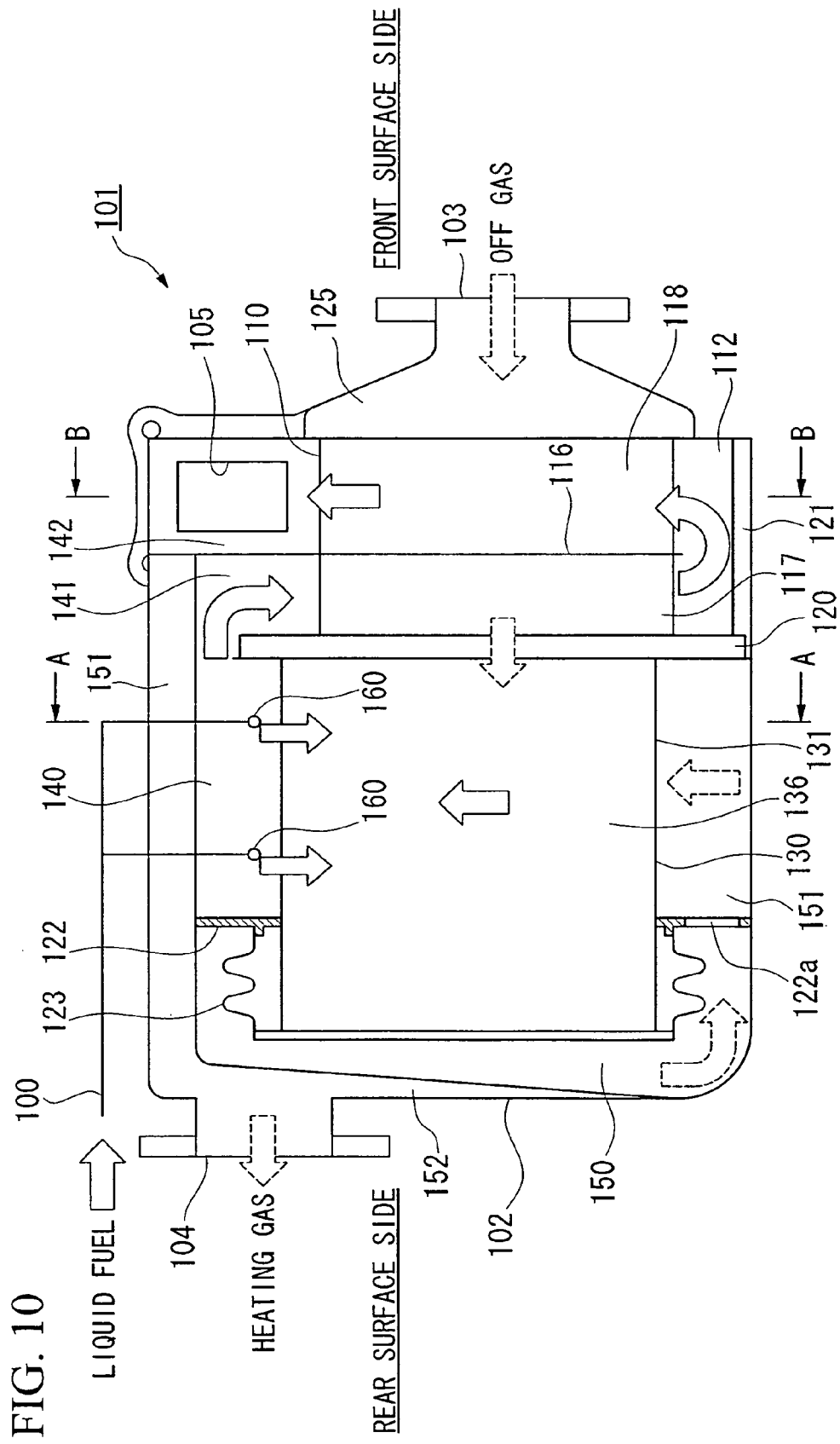
FIG. 10 is a vertical cross-sectional view of a vaporizer according to the fourth embodiment of the present invention.
Figure 11:
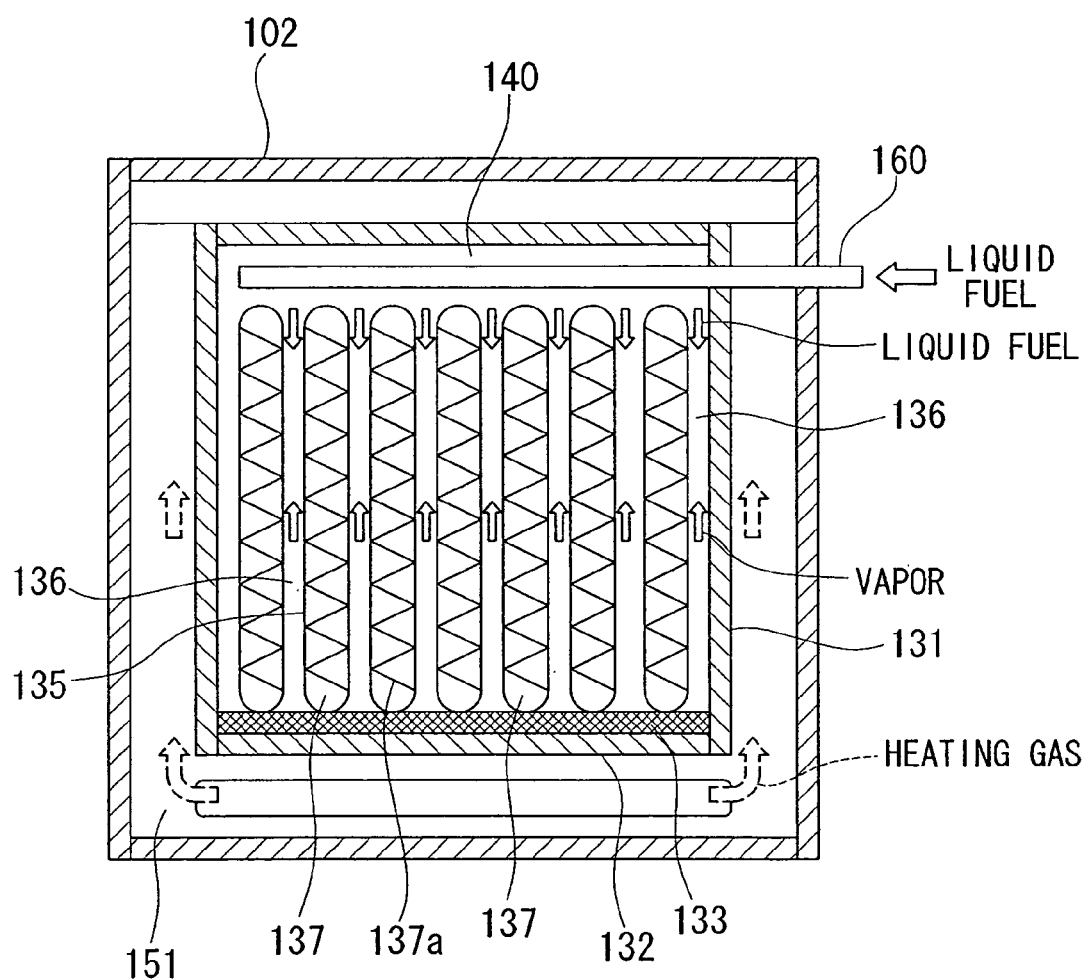
FIG. 11 is a cross-sectional view taken along the line A-A in FIG. 1.
Figure 12:
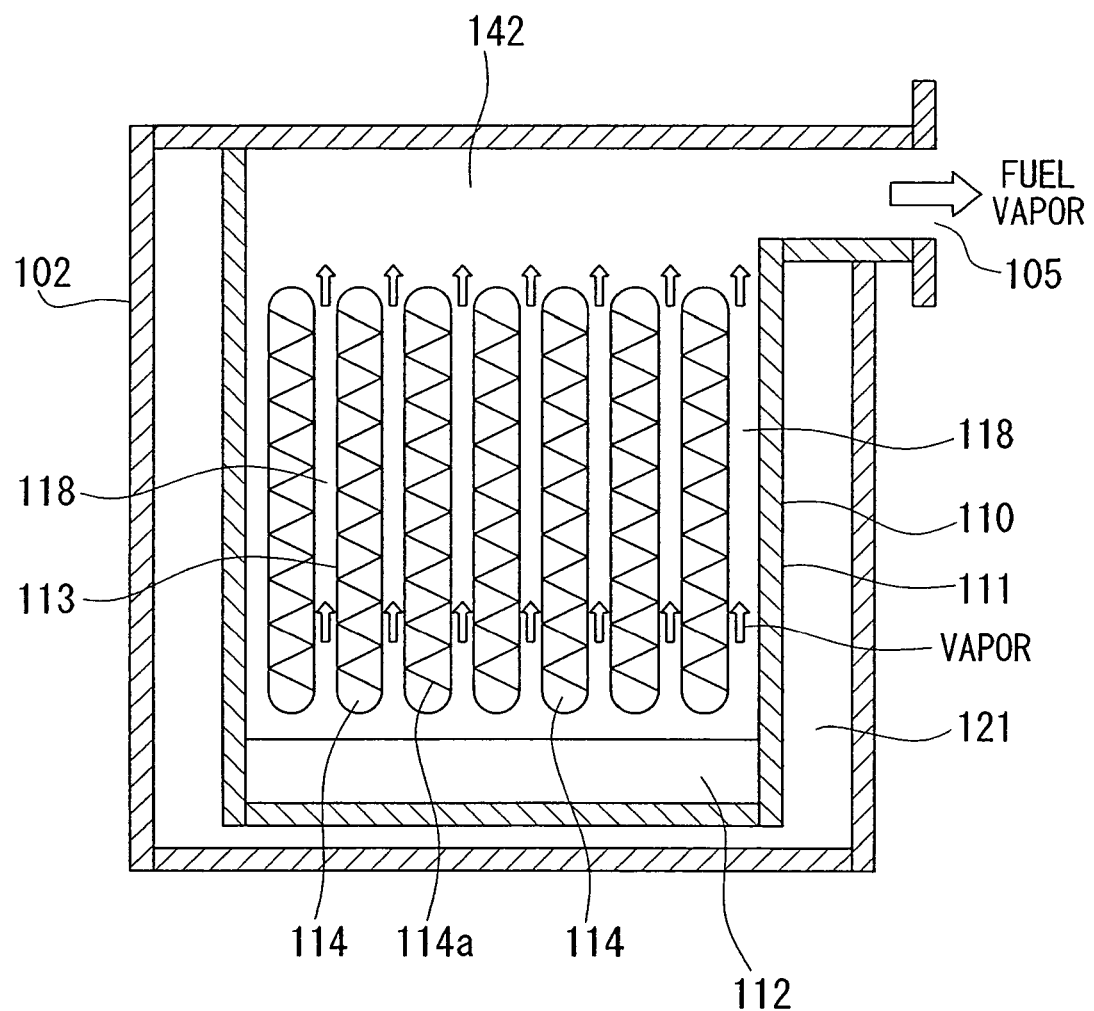
FIG. 12 is a cross-sectional view taken along the line B-B in FIG. 1.

FIG. 10 is a vertical cross-sectional view of a vaporizer 101. FIG. 11 is a cross-sectional view taken along the line A-A in FIG. 10, while FIG. 12 is a cross-sectional view taken along the line B-B in FIG. 10. The vaporizer 101 is provided with a box shaped housing 102, and a heating gas intake aperture 103 is provided in a front surface (i.e., on the right side in FIG. 10) of the housing 102. A heating gas discharge aperture 104 is provided in the rear surface (i.e., on the left side in FIG. 10) of the housing 102, and a vapor discharge aperture 105 is provided in a side surface (i.e., on the rear surface side in FIG. 10) of the housing 102. Note that, in the description given below, the term "front surface" indicates the right side in FIG. 10, while the term "rear surface" indicates the left side in FIG. 10.

A superheating core 110 is positioned on the front surface side inside the housing 102 of the vaporizer 101, and a vaporizing core 130 is provided on the rear surface side of the superheating core 110.

Figure 13:
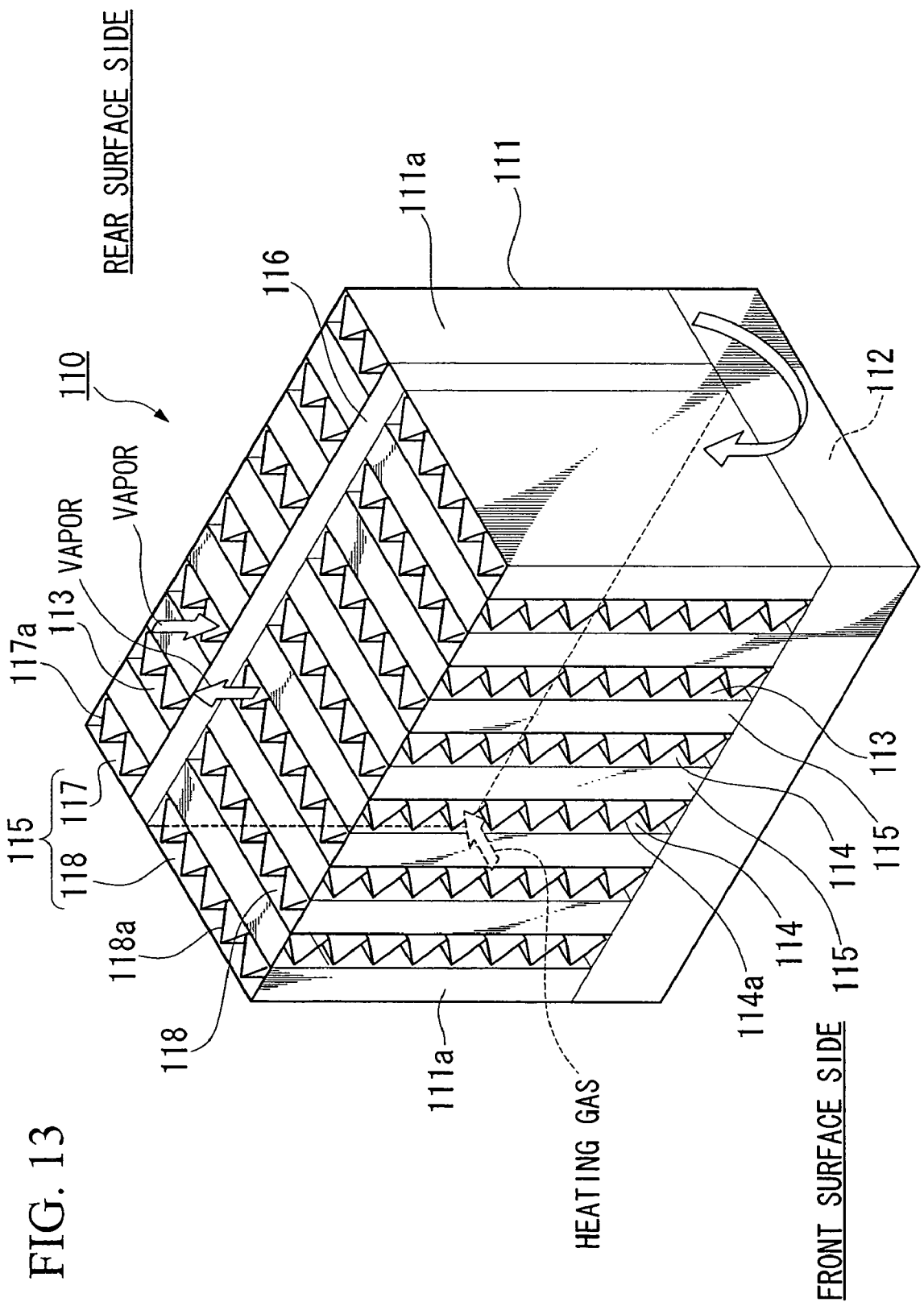
FIG. 13 is a typical view of a superheating core of the vaporizer of the fourth embodiment.

As is shown in typical view in FIG. 13, the superheating core 110 is provided with a rectangular parallelepiped shaped case 111, and a vapor flow path 112 is formed in the bottom portion inside the case 111. The interior of the case 111 above the vapor flow path 112 is divided into a large number of narrow width chambers that are formed in parallel with each other by partition walls 113 that extend from the front surface side towards the rear surface side, and these chambers are formed alternatingly as heating gas flow paths (i.e., heating gas direct flow paths) 114 and vapor flow paths 115.

Each of the heating gas flow paths 114 is closed off at the top portion and bottom portion thereof so as to be shut off from the vapor flow path 112, while the two side portions thereof are blocked by partition walls 113. Fins 114a having a substantially triangular waveform-shaped cross-section are placed inside each heating gas flow path 114 such that apex portions thereof extend in a horizontal direction from the front surface side towards the rear surface side. In addition, apex portions of these fins 114a are joined to the partition walls 113. A Pt based oxidation catalyst is supported on the surface of the fins 114. Moreover, as is shown in FIG. 10, the apertures on the front surface side of the respective heating gas flow paths 114 are connected to the heating gas intake aperture 103 via a heating gas distribution chamber 125, while the apertures on the rear surface side are connected to a connecting chamber 120 that is provided between the superheating core 110 and the vaporization core 130.

In contrast, each vapor flow path 115 is divided by a partition wall 116 that is provided partway along the vapor flow paths into a rear surface side first vapor flow path (i.e., a superheating section) 117 and a front surface side second vapor flow path (i.e., a superheating section) 118. Both the vapor flow paths 117 and 118 have a structure in which front surface sides and rear surface sides are blocked off by peripheral walls 111a of the case 11 or by the partition wall 116. In addition, the two side portions thereof are blocked of by the peripheral walls 111a or by the partition wall 113, while the top portions and bottom portions are completely open. Fins 117a and 118a having a substantially triangular waveform-shaped cross-section are provided respectively inside the first vapor flow paths 117 and the second vapor flow paths 118 such that apex portions thereof extend in a vertical direction (i.e., in the direction of gravity). The apex portions of the fins 117a and 118a are joined to the partition wall 113.

All of the bottom portion apertures of the respective vapor flow paths 117 and 118 are connected to the vapor flow path 112. In addition, as is shown in FIG. 10, the top portion apertures of the first vapor flow paths 117 are connected to a vapor flow path 141 that is provided in a top portion of the connecting chamber 120 and the first vapor flow paths 117 inside the housing 102. The top portion apertures of the second vapor flow paths 118 are connected to a vapor flow path 142 that is provided in a top portion of the second vapor flow paths 118 inside the housing 102, and the vapor flow path 142 is connected to a vapor discharge aperture 105.

Furthermore, as is shown in FIG. 12, a bottom portion and both side portions of the superheating core 110 are enclosed by a thermal insulating chamber 121 that is formed by an airtight space inside which the air has been sealed, so that the temperature of the superheating core 110 is kept constant.

Figure 14:
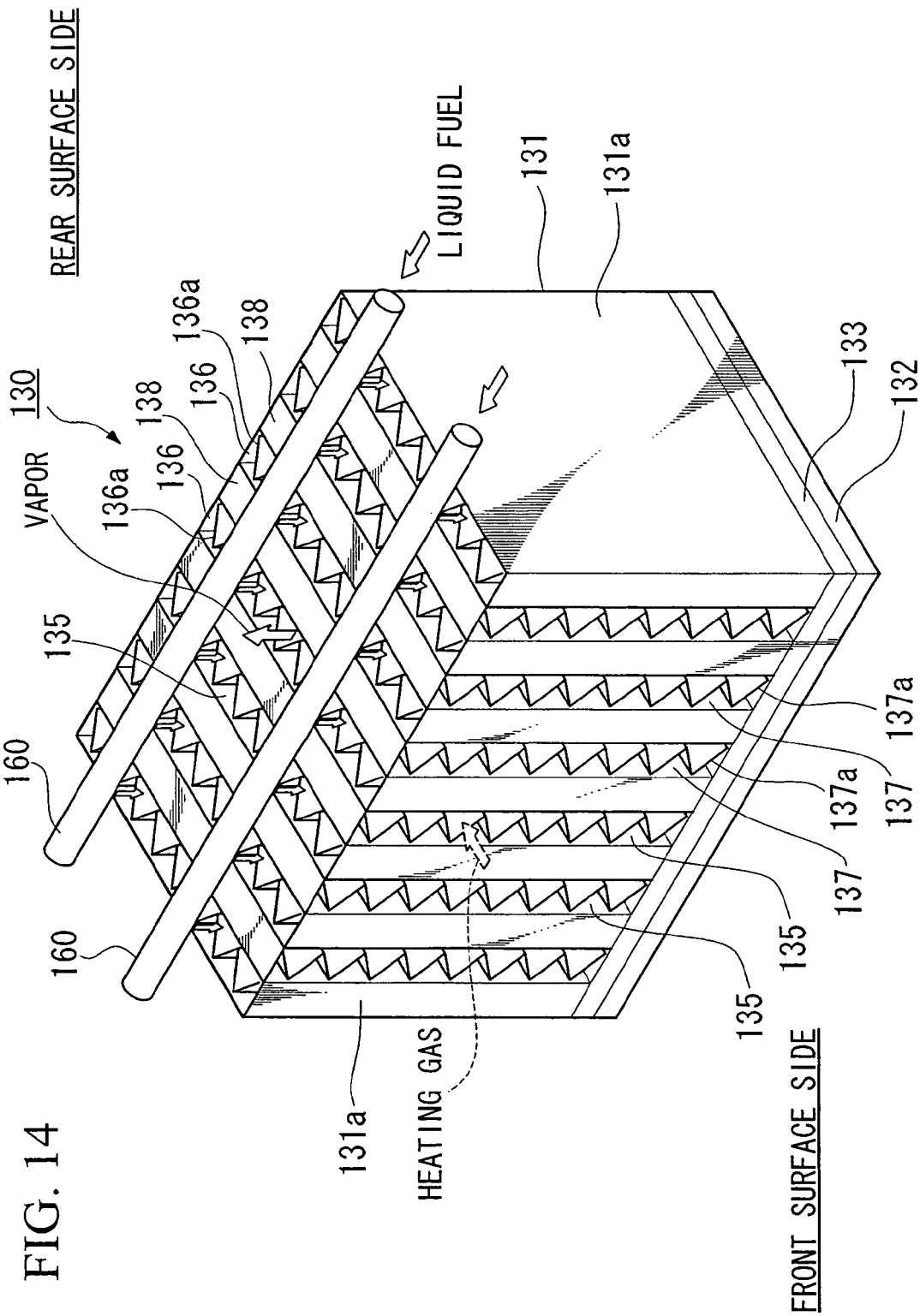
FIG. 14 is a typical view of a vaporizing core of the vaporizer of the fourth embodiment.

On the other hand, as is shown in typical view in FIG. 14, the vaporization core 130 is provided with a case 131 having the shape of a rectangular parallelepiped. A porous material 133 is mounted on the top side of a bottom plate (i.e., a bottom portion) 132 of the case 131. The porous material 133 may be formed, for example, by a nickel-based metal porous material having a large specific surface area (having, for example, a hole diameter of 0.5 mm and a specific surface area of 7500 $m^2/m^3$), and is brazed onto the bottom plate 132. The interior of the case 131 above the porous material 133 is divided into a large number of narrow width chambers that are formed in parallel with each other by partition walls 135 that extend from the front surface side towards the rear surface side, and these chambers are formed alternatingly as vaporization flow paths (i.e., vaporization sections) 136 and heating gas flow paths (i.e., heating gas direct flow paths) 137.

Figure 15:
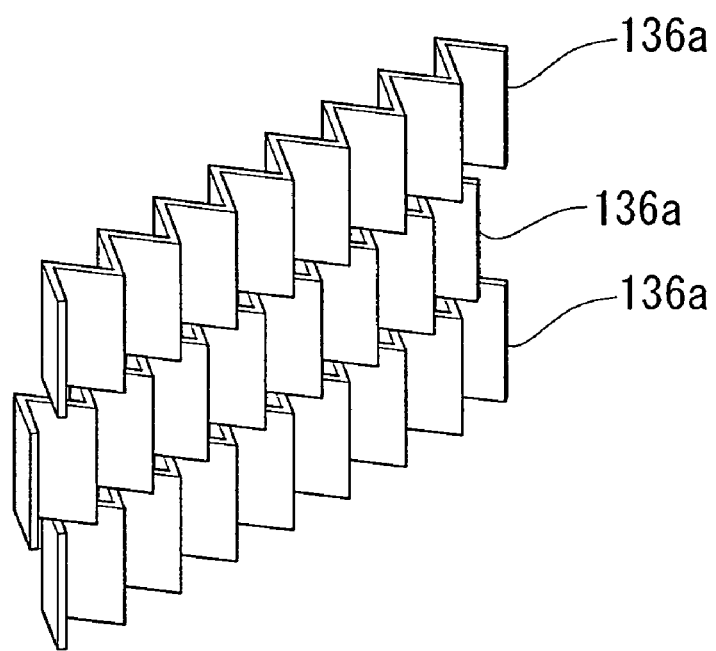
FIG. 15 is an external perspective view of fins that are provided on a vaporization flow path of the vaporizer of the fourth embodiment.

Each of the vaporization flow paths 136 is open only at the top, and bottom portions thereof are blocked by the bottom plate 132 that is provided with the porous material 133, while all four sides are blocked by peripheral walls 131a of the case 131 and by partition walls 135. Namely, each vaporization flow path 136 is formed as a box shape that is open only at the top. Fins 136a having a substantially triangular waveform-shaped cross-section are placed inside each vaporization flow path 136 such that apex portions thereof extend in a vertical direction (i.e., in the direction of gravity). In addition, as is shown in FIG. 15, the fins 136a are installed in steps running in the up-down direction inside each vaporization flow path 136, and fins 136a that are adjacent vertically are positioned such that the apex portions of one fin 136a are offset from the apex portions of the adjacent fins 136a. The apex portions of these fins 136a are joined to the partition walls 135 that form a boundary with the heating gas flow paths 137.

In contrast, each of the heating gas flow paths 137 is blocked at the top by a top plate 138, and bottom portions thereof are blocked by the bottom plate 132 that is provided with the porous material 133. Both side portions are blocked by the partition walls 135, while the front surface side and rear surface side of the case 131 are completely open. Namely, each heating gas flow path 137 is formed as a rectangular cylinder whose opening extends from the front surface side to the rear surface side. Accordingly, each heating gas flow path 137 of the vaporization core 130 is connected to the heating gas flow paths 114 of the superheating core 110 via the connecting chamber 120. In addition, fins 137a having a substantially triangular waveform-shaped cross-section are provided inside each heating gas flow path 137 such that apex portions thereof extend in a horizontal direction. The apex portions of these fins 137a are joined to the partition walls 135 that form a boundary with the vaporization flow paths 136. A purifying catalyst (such as Pt, Pd, or Rh) suitable for purifying emissions such as carbon monoxide (CO) is supported on the surface of the fins 137a.

As is shown in FIG. 10, the vaporization core 130 is inserted through a hole in a support plate 122 that is fixed vertically inside the housing 102. An outer circumference of an end portion on the rear surface side of the case 131 and the support plate 122 are connected by bellows 123 that absorb thermal expansion.

As is shown in FIG. 10 and FIG. 11, a vaporization chamber 140 is provided inside the housing 102 in a top portion of the vaporization core 130 that is positioned on the front surface side of the support plate 122. Top portion apertures of the respective vaporization flow paths 136 of the vaporization core 130 are connected to the vaporization chamber 140, and the vapor flow path 141 mentioned above is also connected to the vaporization chamber 140.

Figure 16:
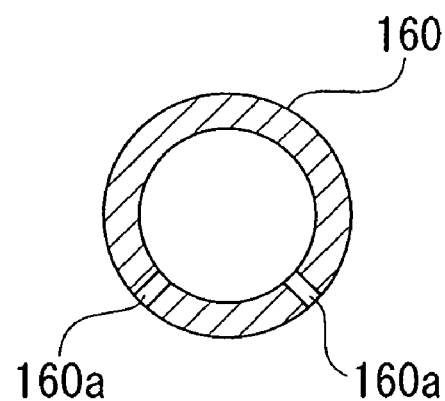
FIG. 16 is a cross-sectional view of a fuel supply pipe of the vaporizer of the fourth embodiment.

Two fuel supply pipes (i.e., fuel supply sections) 160 and 160, whose axes extend in a direction in which the vaporization flow paths 136 and the heating gas flow paths 137 line up adjacent to each other, are provided in parallel with each other in the vaporization chamber 140. Distal ends of each fuel supply pipe 160 are blocked, and, as is shown in FIG. 16, pairs of supply holes 160a are open in each fuel supply pipe 160 facing diagonally downwards to the left and right in portions that are located above the respective vaporization flow paths 136. Liquid fuel (i.e., a mixed liquid of methanol or gasoline and water or the like) is supplied to each fuel supply pipe 160 via a liquid fuel supply line 100.

A heating gas flow path 150 is formed inside the housing 120 so as to surround the back portion of the vaporization core 130 and the outer circumference of the bellows 123. The aperture on the rear surface side of each heating gas flow path 137 of the vaporization core 130 is connected to the heating gas flow path 150.

Furthermore, as is shown in FIG. 10 and FIG. 11, a heating gas flow path (i.e., a temperature control section) 151 is formed inside the housing 102 so as to surround the bottom portion and both side portions of the vaporization core 130 that is positioned on the front surface side of the support plate 122, and so as to surround the top portion and both side portions of the vaporization chamber 140.

The heating gas flow path 150 and the vaporization chamber 140 are separated by the support plate 122. The heating gas flow path 150 and the heating gas flow path 151 are also separated by the support plate 122, however, the heating gas flow path 150 and the heating gas flow path 151 are connected via the aperture 122a that is formed in the support plate 122 on the bottom side of the vaporization core 130.

The heating gas flow path 151 is also connected to a heating gas flow path 152 that is formed inside the housing 102 so as to surround the rear portion, the top portion, and both side portions of the heating gas flow path 150. The heating gas flow path 152 is connected to the heating gas discharge aperture 104.

The operation of the vaporizer 101 constructed in this manner will now be described.

Firstly, the flow of the heating gas will be described. The arrows depicted by broken lines in FIG. 10, FIG. 11, FIG. 13, and FIG. 14 indicate the flow direction of the heating gas.

In this fourth embodiment, cathode off gas that contains oxygen discharged from the cathode of a fuel cell (not shown) and anode off gas that contains hydrogen discharged from the anode of the fuel cell are supplied from the heating gas intake aperture 103. These off gases are then supplied to each heating gas flow path 114 of the vaporization core 130 via the heating gas distribution chamber 125. The off gases advance horizontally along the respective heating gas flow paths 114 from the front surface side to the rear surface side, and as the off gases flows along the respective heating gas flow paths 114 they are catalytically combusted by the oxidation catalyst that is supported on the fins 114a. Combustion gas that is generated by this combustion is used in the present embodiment as heating gas. A portion of the heat from the heating gas is transmitted to the partition walls 113 of the superheating core 110 via the fins 114a, and is further transmitted to the fins 117a and 118a of the vapor flow paths 117 and 118 of the superheating core 110. Note that the temperature of the fins 117 and 118 is kept at or above the saturated vapor temperature of the liquid fuel.

The heating gas that has advanced inside the respective heating gas flow paths 114 of the super heating core 110 flows into the respective heating gas flow paths 137 of the vaporization core 130 via the connecting chamber 120, and advances horizontally through the respective heating gas flow paths 137 from the front surface side to the rear surface side. Note that, because the superheating core 110 and the vaporization core 130 are placed on a straight line, even if the connecting chamber 120 is placed between the two, the heating gas moves in a straight line substantially horizontally from the aperture on the front surface side of the heating gas flow paths 114 until it arrives at the aperture on the rear surface side of the heating gas flow paths 137. Accordingly, there is an extremely small loss of pressure in the heating gas from when it enters the superheating core 110 until it exits from the vaporization core 130, so that a large quantity of heating gas can be circulated. In addition, because the superheating core 110 and the vaporization core 130 are placed on a straight line, the connecting chamber 120 can be formed as a short, rectilinear path. As a result of this, it is possible to suppress heat discharge from the connecting chamber 120, so that heating gas can be supplied to the vaporization core 130 at a higher temperature. In addition, the size of the vaporizer 101 can be reduced.

As the heating gas circulates along the respective heating gas flow paths 137, unreacted hydrogen contained in the heating gas is catalytically combusted by the purifying catalyst supported on the fins 137a, thereby raising the temperature of the gas. Moreover, if emissions such as CO are present in minute quantities in the heating gas, the purifying catalyst supported on the fins 137a catalytically combusts these emissions and purifies them. A portion of the heat from the heating gas is transmitted to the partition walls 135 of the vaporization core 130 via the fins 137a, and is further transmitted to the fins 136a of the vaporization flow paths 136 of the vaporization core 130.

In this manner, because heating gas is created by the catalytic combustion of off gas using a catalyst that is provided on both the heating gas flow paths 114 of the super heating core 110 and on the heating gas flow paths 137 of the vaporization core 130, compared with when a catalytic combustor is installed outside the vaporizer 101, it is possible to suppress the discharge of heat from the heating gas flow paths 114 and 137 and thereby improve the heating efficiency, and it is possible to make the overall reforming system more compact.

Note that the temperature conditions in the superheating core 110 and the vaporization core 130 are different. Accordingly, because the temperature of the fins 114a of the heating gas flow paths 114 is different from that of the fins 137a of the heating gas flow paths 137, by employing catalysts having an active temperature that is appropriate for the respective temperature conditions as the catalysts that are supported respectively on the fins 114a and the fins 137a, the durability of the catalysts can be extended.

The heating gas that has advanced directly inside the heating gas flow paths 137 of the vaporization core 130 flows into the heating gas flow path 150. The flow direction of the heating gas is then inverted in the heating gas flow path 150, and the heating gas flows through the apertures 122a of the support plate 122 and into the heating gas flow path 151.

Heating gas that has flowed from the apertures 122a and to the heating gas flow path 151 heats the porous material 133 via the bottom plate 132 of the vaporization core 130, and circles around both sides so as to rise up, and then circles around the side portions of the vaporization core 130 and the top of the vaporization chamber 140 (see FIG. 11). As a result of the heating gas flowing to the heating gas flow path 151 in this manner, it is possible to heat the porous material 133 without providing an external heating source. In addition, a temperature controlled layer is formed around the vaporization core 130 and the vaporization chamber 140, and the discharge of heat from the vaporization core 130 can be suppressed.

The heating gas then circulates from the heating gas flow path 151 through the heating gas flow path 152 and is discharged to the outside of the system from the heating gas discharge aperture 104.

Next, the flow of liquid fuel (i.e., a mixture of methanol or gasoline or the like and water) and fuel vapor will be described. In FIGS. 10 to 14, the arrows shown by the solid lines indicate the flow direction of the liquid fuel or fuel vapor.

The liquid fuel is supplied from the liquid fuel supply line 100 to each fuel supply pipe 160. The liquid fuel is then injected from the supply holes 160a that are provided in the fuel supply pipes 160 towards the respective vaporization flow paths 136 of the vaporization core 130. The liquid fuel that has been injected from the supply holes 160a forms droplets that adhere to the fins 136a of the respective vaporization flow paths 136 and drops downwards while moving over the surfaces of the fins 136a. Alternatively, the liquid fuel falls through the gaps formed between the fins 136a. The majority of the liquid fuel that falls through the gaps between the fins 136a collides with lower placed fins 136a as it falls, and adheres to the surfaces of these fins 136a. In either case, the liquid fuel flows downwards in the gravitational direction inside the vaporization flow paths 136. The liquid fuel that has adhered to the fins 136a exchanges heat with the heating gas that is circulating through the heating gas flow paths 137 via the partition walls 135 and the fins 136a, and is vaporized to form fuel vapor. The liquid fuel that could not be vaporized as it fell through the interior of the vaporization flow paths 136 permeates through the minute holes in the porous material 133 before it reaches the bottom plate 132, and here exchanges heat with the heating gas via the porous material 133 so as to be instantly vaporized and form fuel vapor.

The fuel vapor that has been created in this manner rises upwards in the direction of gravity inside the vaporization flow paths 136 and is discharged from the top portion apertures of the vaporization flow paths 136 to the vaporization chamber 140.

Accordingly, in this vaporizer 130, while liquid fuel or fuel vapor circulates inside the vaporization flow paths 136 either upwards or downwards in the direction of gravity, as described above, the heating gas flows in a horizontal direction inside the heating gas flow paths 137, therefore, the flow directions intersect each other.

In this vaporization core 130, because the vaporization flow paths 136 and the heating gas flow paths 137 are placed alternatingly, it is possible to improve the vapor creation performance while keeping the size of the apparatus small.

Moreover, because the fins 136a are provided on the vaporization flow paths 136, the surface area of the heating surface is extremely large, so that it is easy for the liquid fuel to spread out, resulting in the vaporization of liquid fuel being accelerated.

In addition, when the liquid fuel collides against the fins 136a, in addition to adhering to the positions where it collides (referred to below as collision positions), the liquid fuel is also scattered and the scattered liquid fuel collides once again with fins 136a close to the collision positions. Because such collisions are repeated, the frequency at which the liquid fuel comes into contact with the surfaces of the fins 136a, which are heated surfaces, increases, so that the vaporization of the liquid fuel is accelerated.

In particular, because the fins 136a are provided in steps in a vertical direction and because the apex portions of the fins 136a are offset vertically, the frequency of the collisions of liquid fuel against the fins 136a is further increased, and the vaporization of the liquid fuel is further accelerated.

Furthermore, because a temperature gradient is generated in the fins 136a in a direction approaching or moving away from the partition walls 135, a temperature difference between the surfaces of the fins 136a and the liquid fuel that is adhered to these surfaces is created in the portion forming a nucleate boiling zone, so that heat is easily transmitted in this portion, and liquid fuel that has adhered to the surface of the fins 136a is easily vaporized.

Moreover, because the temperature distribution over the whole of the fins 136a inside the vaporization flow paths 136 is made substantially uniform by the thermal conduction of the fins 136a, the entire range of the vaporization flow paths 136 can be used as a heat exchange portion, so that liquid fuel can be efficiently vaporized and changed into fuel vapor.

Furthermore, by vertically offsetting the apex portions of the fins 136a, all of the gaps between the fins 136a in a single vaporization flow path 136 are connected. Therefore, liquid droplets of liquid fuel that fall through the vaporization flow paths 136 and also created fuel vapor are scattered and distributed, so that the entire thermal load inside a single vaporization flow path 136 is made uniform. Accordingly, the liquid fuel can be efficiently vaporized.

Moreover, because the droplets of liquid fuel fall from top to bottom inside the vaporization flow paths 136, and the created fuel vapor rises inside the vaporization flow paths 136, the droplets of liquid fuel and the fuel vapor come into contact due to their counter flow so that preheating and refinement of the droplets is accelerated. In addition, the liquid film of liquid fuel that is formed on the surface of the fins 136a is thinned out more rapidly resulting in the vaporization of liquid fuel being accelerated.

Accordingly, the vaporizer 101 is able to vaporize liquid fuel extremely efficiently and rapidly, and has excellent response.

Fuel vapor that has been discharged into the vaporization chamber 140 passes through the vapor chamber 141, and flows into the respective first vapor flow paths 117 of the superheating core 110. The fuel vapor then circulates through each first vapor flow path 117 downwards in the vertical direction (i.e., in the direction of gravity), and flows into the vapor flow path 112. As the fuel vapor circulates through the first vapor flow paths 117, it exchanges heat with the heating gas that is circulating through the heating gas flow paths 114 via the partition walls 113 and the fins 117a, and is heated.

The flow direction of the fuel vapor that flows into the vapor flow path 112 is inverted 180 degrees in the vapor flow path 112, so that the fuel vapor flows into the respective second vapor flow paths 118 of the superheating core 110, flows through each of the second vapor flow paths 118 upwards in a vertical direction (i.e., in the direction of gravity), and is discharged into the vapor flow path 142. As the fuel vapor circulates through the second vapor flow paths 118, it exchanges heat with the heating gas that is circulating through the heating gas flow paths 114 via the partition walls 113 and the fins 118a, and is heated.

Namely, because the fuel vapor circulates so as to intersect twice with the flow direction of the heating gas in the superheating core 110, and exchanges heat with the heating gas twice as it circulates through the superheating core 110, it is sufficiently heated, and it is possible to raise the temperature of the fuel vapor to a temperature that is close to the temperature of the heating gas in the upstream portions of the heating gas flow paths 114. Moreover, because the fins 114a of the heating gas flow paths 114 of the superheating core 110 are at or above the saturated vapor temperature, it is possible to superheat the fuel vapor to the saturated vapor temperature or more.

The fuel vapor that has been superheated in the superheating core 110 in this manner is supplied from the vapor flow path 142 to a reformer (not shown) via the vapor discharge aperture 105. It is then reformed into hydrogen rich fuel gas in the reformer, and is supplied to a fuel cell. Note that, because the vapor discharge aperture 105 is provided in a top portion of the side surface of the housing 102, it is possible to prevent the discharge of droplets that are undesirable from the point of view of the reaction in the reformer. Furthermore, it is also possible to prevent droplets that are generated when the operation of the vaporizer 1 is stopped from being discharged into the reformer.

INDUSTRIAL APPLICABILITY

As has been described above, according to the vaporizer of the present invention the excellent effects are achieved that liquid fuel can be vaporized extremely efficiently and rapidly, and the response of the vaporizer is improved considerably.

According to the vaporizer of the present invention, it is possible to improve the vapor creation performance while keeping the size of the apparatus small.

According to the vaporizer of the present invention, the heating gas flow paths can be placed in a horizontal direction so that the placement of the entry and exit apertures of the heating gas flow path is simplified, and the structure of the vaporizer can be simplified. In addition, any loss of pressure on the heating gas flow path can be kept to a lower level.

According to the vaporizer of the present invention, the liquid fuel is dispersed when it collides with the fins, and the dispersed liquid fuel is further dispersed when it collides with fins lower down. By repeating this process, the dispersal of the liquid fuel can be accelerated. In addition, because the rate at which the fuel vapor that is created within the vaporization flow paths rises along these vaporization flow paths can be slowed by the presence of the fins that are provided in a plurality of steps, the droplets of liquid fuel that fall through the vaporization flow paths can be prevented from being blown back up by the fuel vapor, and the droplets can be prevented from being discharged from the top portion of the vaporization flow paths without having been vaporized. Accordingly, the effect is achieved that the frequency at which the liquid fuel comes into contact with the fins increases, so that the vaporization of the liquid fuel is accelerated.

According to the vaporizer of the present invention, it is possible to vaporize liquid fuel that could not be vaporized as it fell through the vaporization flow paths on the porous material, and the effect is achieved that it is possible to prevent pools of liquid being formed on bottom portions of the vaporization flow paths.

According to the vaporizer of the present invention, the effect is achieved that liquid fuel can be supplied after being widely dispersed inside the vaporization flow paths.

According to the vaporizer of the present invention, because any loss of pressure in the heating gas on the heating gas direct movement flow path can be reduced, so that a greater quantity of heating gas can be supplied, the quantity of heat that is supplied can be increased. Moreover, because fuel vapor that is generated in the vaporization section is made to exchange heat with heating gas in the superheating section, the fuel vapor can be raised to an even higher temperature. In addition, because fuel vapor that has been discharged from a top portion of the vaporization section is introduced into the superheating section and circulated in the direction of gravity, the size of the vaporization section can be made more compact. Accordingly, the effects are achieved that it is possible to obtain an improvement in the performance and a reduction in the size of the vaporizer.

According to the vaporizer of the present invention, the effects are obtained that the fuel vapor can be sufficiently heated and high temperature fuel vapor can be created.

According to the vaporizer of the present invention, because liquid fuel that has pooled on the bottom of the vaporization section can be vaporized using exhaust heat from the heating gas, the effect is achieved that the performance of the vaporizer can be improved.

According to the vaporizer of the present invention, because the temperature of the vaporization section can be maintained using exhaust heat from the heating gas and heat discharge from the vaporization section can be suppressed, the effect is achieved that the performance of the vaporizer is improved.

According to the vaporizer of the present invention, because the temperature of the superheating section can be maintained by the thermal insulating chamber, so that heat discharge from the vaporization section can be suppressed, the effect is achieved that the performance of the vaporizer is improved.

According to the vaporizer of the present invention, a predetermined gas can be catalytically combusted inside the heating gas direct movement flow path so as to create heating gas, and heat discharge from the heating gas direct movement flow path can be suppressed, so that the effect is achieved that the performance of the vaporizer is improved.

According to the vaporizer of the present invention, by using different catalysts having different active temperatures, the effect is achieved that it is possible to extend the durability of the catalyst.

According to the vaporizer of the present invention, compared with when a catalytic combustor is installed outside the vaporizer, it is possible to suppress the discharge of heat from the heating gas direct movement flow paths and thereby improve the heating efficiency, and it is possible to make the overall reforming system more compact. In addition, it is possible to provide the vaporizer with an emission purifying function, and to achieve a simpler fuel reforming system.

The invention claimed is:

1. A vaporizer that vaporizes a liquid to generate vapor, the vaporizer comprising:
   a plurality of heating gas flow paths through which heating gas circulates;
   a plurality of vaporization flow paths that are provided with bottoms and are located so as to perform a heat exchange with the heating gas flow paths; and
   a plurality of fins that are provided on inner surfaces of the vaporization flow paths, wherein
      a portion of the liquid supplied from above each of the vaporization flow paths in the vertical direction is vaporized by transmitted heat from the heating gas, and the remaining portion of the liquid and the vaporized liquid come into contact with each other inside each of the vaporization flow paths.

2. The vaporizer according to claim 1, wherein the plurality of heating gas flow paths and the plurality of vaporization flow paths are placed so as to alternate with each other.

3. The vaporizer according to claim 1, wherein at least a portion of each of the plurality of heating gas flow paths is provided in a substantially orthogonal direction relative to the plurality of vaporization flow paths.

4. The vaporizer according to claim 1, wherein the plurality of fins are provided in a plurality of steps running in the vertical direction, and fins in one step are placed so as to be offset from fins in adjacent steps.

5. The vaporizer according to claim 1, wherein there is further provided a porous material that is placed on a top side of the bottoms of the plurality of vaporization flow paths, and a heating apparatus that is placed on a bottom side of the bottoms.

6. The vaporizer according to claim 1, wherein there are further provided liquid supply pipes that are placed above the plurality of vaporization flow paths, and a plurality of supply holes through which the liquid drips are provided in the liquid supply pipes.

7. The vaporizer according to claim 1, wherein the liquid is a liquid fuel containing a hydrocarbon, and the vapor is a fuel vapor used for fuel reformation.

8. A vaporizer that vaporizes a liquid to generate vapor, comprising:
   a heating gas direct movement flow path along which heating gas flows by moving directly in a horizontal direction;
   a vaporization section that is positioned such that it can exchange heat with the heating gas direct movement flow path, and that vaporizes the liquid and causes the vapor therefrom to flow upwards in a vertical direction;
   a liquid supply section that supplies the liquid to the vaporization section; and
   a superheating section that is positioned in an upstream portion on the heating gas direct movement flow path from the vaporization section such that it can exchange heat with the heating gas direct movement flow path, and that places the vapor that is discharged from the top portion of the vaporization section in a superheated state, wherein
   the superheating section is provided with a vapor flow path that is connected with the top portion of the vaporization section and that causes the vapor to circulate.

9. The vaporizer according to claim 8, wherein the vapor flow path of the superheating section is formed so as to intersect with the flow of the heating gas a plurality of times.

10. The vaporizer according to claim 8, wherein there is provided a temperature control section that is placed around the vaporization section and is connected to a discharge aperture of the heating gas direct movement flow path, and the temperature control section is provided with a bottom portion flow path into which the heating gas discharged from the heating gas direct movement flow path is introduced.

11. The vaporizer according to claim 8, wherein the temperature control section is provided with a side flow path that causes the heating gas introduced into the bottom portion flow path to circle around a side of the vaporization section and then rise upwards.

12. The vaporizer according to claim 8, wherein there is provided a thermal insulation chamber that is placed around the superheating section.

13. The vaporizer according to claim 8, wherein a catalyst is provided in an interior of the heating gas direct movement flow path.

14. The vaporizer according to claim 8, wherein a first catalyst is provided in the interior of the heating gas direct movement flow path at a position where it can exchange heat with the superheating section, and a second catalyst is provided in the interior of the heating gas direct movement flow path at a position where it can exchange heat with the vaporizing section.

15. The vaporizer according to claim 14, wherein the heating gas is obtained by burning off gas that is discharged from a fuel cell, the first catalyst is an oxidation catalyst, and the second catalyst is an emission purifying catalyst.

16. The vaporizer according to claim 8, wherein the liquid is a liquid fuel that contains a hydrocarbon, and the vapor is a fuel vapor used for reforming fuel.

* * * * *